R. D. HICKOK.
ELECTRIC MEASURING INSTRUMENT.
APPLICATION FILED JUNE 4, 1909.

962,759.

Patented June 28, 1910.
2 SHEETS—SHEET 1.

Witnesses

Inventor
Robert D. Hickok.

By
Attorney

R. D. HICKOK.
ELECTRIC MEASURING INSTRUMENT.
APPLICATION FILED JUNE 4, 1909.

962,759.

Patented June 28, 1910.

2 SHEETS—SHEET 2.

Witnesses
Geo. L. Thom
M. L. Morton

Inventor
Robert D. Hickok
By
Attorney

UNITED STATES PATENT OFFICE.

ROBERT D. HICKOK, OF ATLANTA, GEORGIA.

ELECTRIC MEASURING INSTRUMENT.

962,759.             Specification of Letters Patent.    Patented June 28, 1910.

Application filed June 4, 1909.  Serial No. 500,057.

*To all whom it may concern:*

Be it known that I, ROBERT D. HICKOK, a citizen of the United States, residing at Atlanta, in the county of Fulton and State of Georgia, have invented certain new and useful Improvements in Electric Measuring Instruments, of which the following is a specification.

This invention is an electric measuring instrument of the galvanometer type, particularly designed and constructed for use as a watt-meter. In instruments of this kind it is common to employ a fixed coil or magnet and a movable or active coil arranged to turn in the magnetic field of the fixed coil, in opposition to the tension of a spring, in consequence of the variation in the electrical conditions in the coils, the movable coil carrying a pointer which indicates the variation on a graduated scale.

The object of the present invention is to provide an improved arrangement characterized by the feature that both coils are mounted to turn or swing, so that the two coils are always at right angles to each other, thus giving a uniform torque of ninety degrees, and consequently giving a uniformly spaced scale, which is not possible with the ordinary fixed and turning coils because of the progressive variation of the angle therebetween.

The provision of a uniformly spaced scale is a decided advantage in the construction of instruments of the kind referred to. Another advantage of the construction herein described is that the motion of the indicating needle is limited, which causes it to come to rest sooner than if it were allowed to swing entirely across the scale, the needle being adjusted by hand to an approximate indication before it assumes its exact position in consequence of the current, said position being determined by turning the coils until the needle swings free, as more fully described hereinafter.

An embodiment of the invention is illustrated in the accompanying drawings in which—

Figure 1:
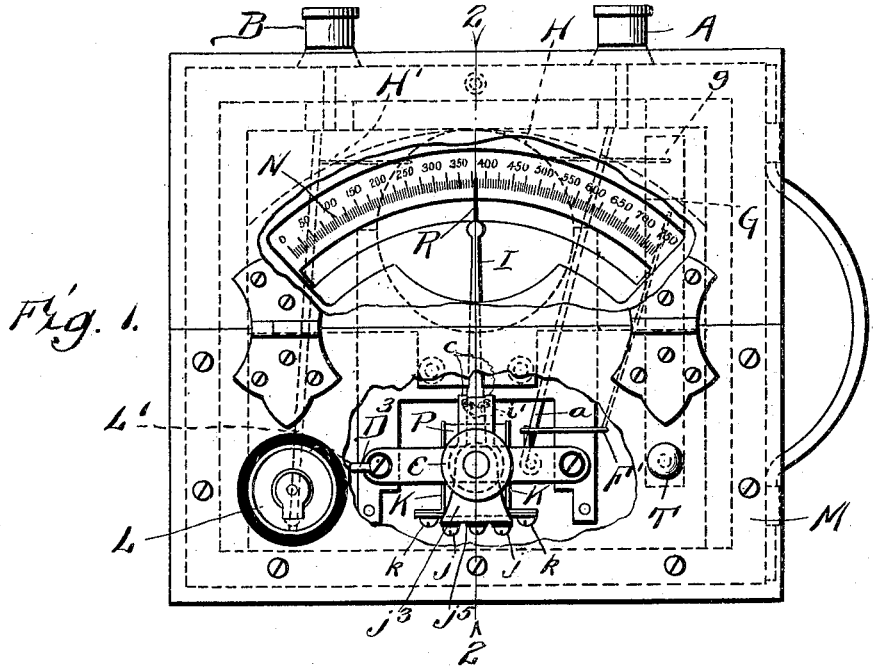
Figure 4:
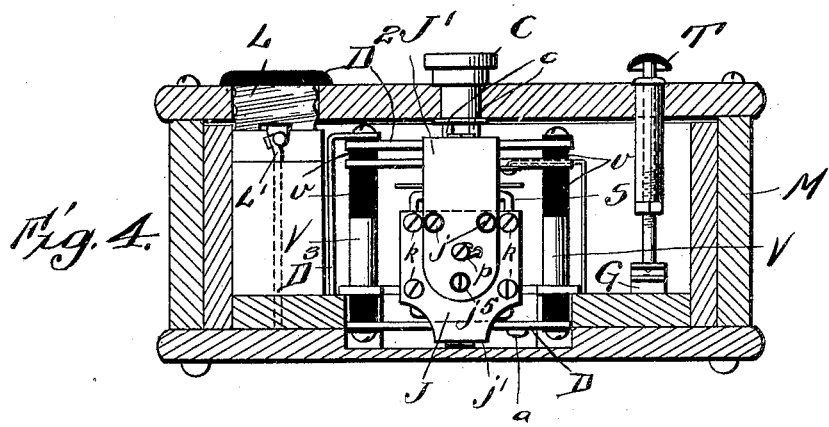
Figure 2:
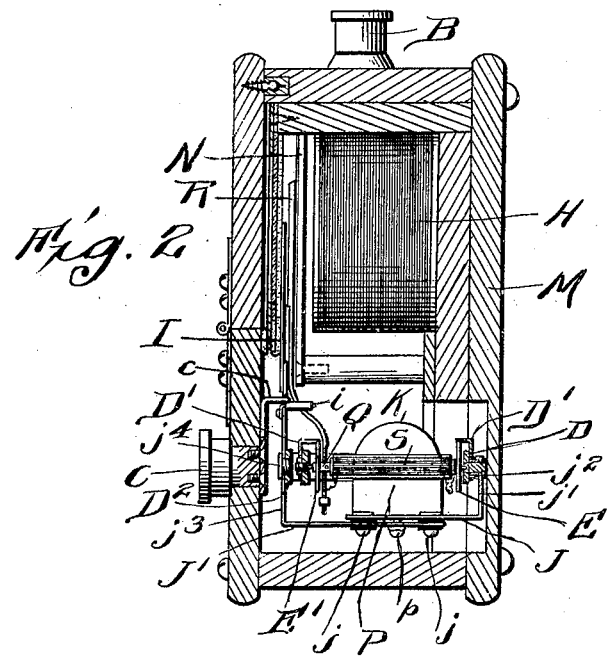
Figure 3:
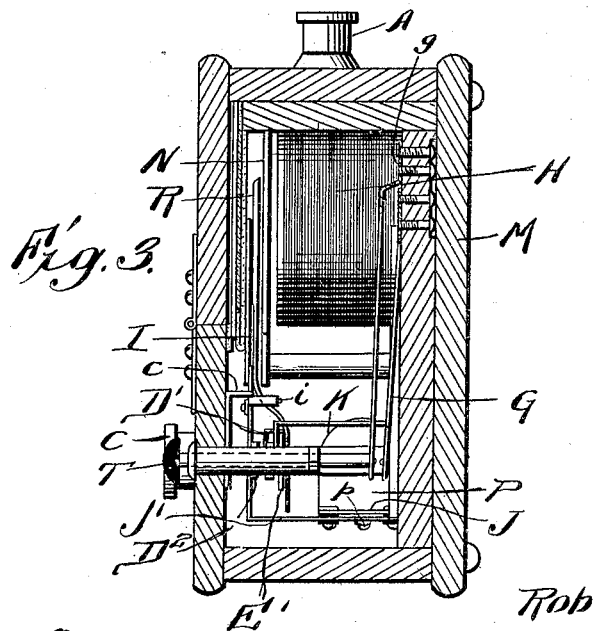

Figure 1 is a plan view, the cover of the casing of the instrument being partly broken away; Fig. 2 is a vertical section on the line 2—2 of Fig. 1; Fig. 3 is an end elevation with the casing; Fig. 4 is a side elevation with the casing in section.

Referring specifically to the drawings, M indicates the casing of the instrument made of wood or other material and N indicates the graduated scale on which the indication is shown by the pointer R which is carried by the arbor Q of the excited or actuated coil S, movement of the pointer from left to right being resisted by the tension of upper and lower hair springs E' and E. The inner ends of these hair springs are connected to the arbor and the outer ends are connected to regulators D', by which the tension of the springs is adjusted as desired. These parts are not particularly different from similar parts in old instruments.

The actuated coil S extends around or incloses the actuating or current coil P, in the embodiment shown, and at a right angle to the axis of said coil. Although the actuating coil in the instrument illustrated is placed inside the actuated or active coil, it could be placed outside and around the actuated coil if desired, the principle and action in either case being the same. The actuating coil is mounted upon a pivoted or swinging frame, consisting, as shown, of two plates J and J', the end plates K of the coil being fastened to the plate J by screws K, and the two plates J and J' being connected together by screws $j$. The lower end of the plate J is extended and bent under the frame in which the coils are mounted, as indicated at $j'$, and is pivotally attached to the lower bar or bridge D of the frame by means of a pivot post $j^2$ which is in axial alinement with and also supports the lower bearing of the arbor Q of the active coil S. The upper end of the other plate J' of the swinging frame is extended and bent over the top of the frame, as indicated at $j^3$, and is pivoted to the upper bridge $D^2$ of said frame by a pivot $j^4$ which is in axial alinement with the arbor Q. Said upper arm $j^3$ is extended forwardly toward the scale to form an indicator I which shows the relative position of the actuating coil with respect to the angle of indication. The arm or indicator I carries two depending fingers $i'$ between which the pointer P extends, so that when the frame carrying the actuating coil is turned the pointer, and consequently the actuated coil, is also turned therewith to approximately the same position, the movement of the pointer, however, being resisted by the springs connected to the arbor of the active coil. H is a resistance coil.

The electrical connections and other features of construction will be sufficiently evident from the following descriptions of the circuits. Beginning at the binding post A the current is carried by a wire $a$ to the lower bridge D which is mechanically and electrically attached to both the active or actuated and the current or actuating coils S and P respectively. Connection to the former is made through the regulator D' and the lower hair spring E to the arbor and one terminal of the winding of the coil S, and then out through the upper hair spring to a bridge F from which it is carried by a wire F' to the lower plate of the key G, which may be closed by pressure on the upper spring plate thereof by means of a push pin T extending through the top of the casing. When the key is closed the current continues through the upper plate and out through the wire $g'$ to the resistance coil H from which it is carried out through a wire H' to the other binding post B, thus completing the circuit of the active coil which is in shunt to the working circuit. The actuating or relatively fixed coil P is electrically connected to the said bridge D by the plate J, said plate being electrically connected to one end of the coil P and the other end of the coil is connected to the plate $j'$ by a wire and binding post $p$, the plates J and J' being insulated from each other by an insulation at $j^5$ around the connecting screws $j$. The upper plate J' conducts the current to the upper bridge $D^2$, bridges D, $D^2$ and F being mounted upon pillars V and insulated from each other, as indicated at $v$. From the bridge $D^2$ the circuit extends through wire $D^3$ to the socket L, which serves for the connection of the lamp, motor, or other device which is consuming the current to be measured, and from which the circuit is carried back through the socket and the wire L' to the binding post B. In practice the socket may be substituted by binding posts or any other connecting arrangement for the work at hand.

The frame carrying the coils may be turned by a button C which extends through the top of the casing and is provided with depending fingers $c$ which engage the indicator I, and when said button is turned the frame J and J' and the coil P carried thereby, as well as the pointer R and the active coil S, are turned accordingly, thereby maintaining the relative angularity of the two coils under all conditions, the active coil S, of course, swinging in opposition to the tension of the hair springs.

In the use of the instrument a current passed through the coils will tend to turn the actuated coil P. The button C is then turned until the needle swings free, said needle having a limited free swing between the fingers $i$ depending from the indicator I. It is obvious that the torque will hold the pointer R against one of said fingers until the frame is turned so that the indicator I approximates the deflection produced by the current being measured, and when this point is reached the needle will swing free between the fingers $i$ and will finally come to rest at the exact reading of the meter, and for particularly fine reading the frame carrying the actuating coil may then be turned until the indicator I registers exactly with the pointer R, in which position the axes of the two coils are at exactly a right angle to each other. Hence the indication is given when the torque produced by the coils in exactly rectangular position is equaled by the tension of the springs incident to the movement of the pointer. Accordingly the scale may be made uniform, no correction for varying angularity being necessary. The construction also has the minor advantage that the needle is confined between the depending fingers $i$ and is moved by hand to approximate position, and consequently violent oscillations are avoided and the needle will quite quickly come to rest, the approximate position, when the needle is being turned by hand, being detected when the needle begins to swing free in its limited space.

No limitation is implied by reason of the particular structure shown and described, and the same principle may be embodied in various modifications. Under certain conditions, such as a heavy current, it may be advisable to separate the connections to the different coils, instead of connecting both to the bridge D. Various other modifications may be made with respect to substitution of parts or different arrangement of parts, within the scope of the invention.

I claim:

1. In an electrical measuring instrument, the combination of a current coil, a turning magnetic element located in the field of said coil for actuation thereby, the coil being pivotally mounted to enable a uniform angular relation between said coil and said element to be preserved under all conditions of current, and means connected to said element to yieldingly hold the same in zero position.

2. In an electrical measuring instrument, the combination of a frame, an actuating magnetic member the magnetic force of which may be varied, said member being pivoted in the frame, an actuated magnetic member located in the magnetic field of said member, the actuating member being manually movable to vary its position in the frame according to the variation of its magnetic force to preserve a uniform angular relation between said members, and means connected to the actuated member to yieldingly hold the same in zero position.

3. In an electrical measuring instrument, the combination of a frame, an actuating electro-magnetic coil pivoted in the frame and through which the current to be measured may be passed, and an actuated coil pivotally mounted in the magnetic field of said coil, the position of the actuating coil being manually variable in the frame according to the variation of the current passed therethrough to preserve a predetermined angular relation to said actuated coil, and means connected to the last mentioned coil tending to hold the same in zero position.

4. In an electrical measuring instrument, the combination of an actuating coil through which current to be measured may be passed, and an actuated coil in rectangular relation in the magnetic field of said coil, both of the coils being pivoted concentrically, whereby the actuating coil may be turned with the actuated coil to preserve said angular relation under all conditions of current, and a spring tending to return the actuated coil to zero position.

5. In a watt-meter, the combination of a frame, an actuating coil angularly movable in the frame and arranged in a circuit through which current to be measured may be passed, and a turning actuated coil in shunt to said circuit and located in the magnetic field of said coil and means to yieldingly maintain the actuated coil in rectangular relation to the actuating coil, said coil being manually movable in the frame according to the turn of the actuated coil to preserve said relation under all conditions of current.

6. In an electrical measuring instrument, the combination of coöperating magnetic members positioned with their lines of force at a right angle to each other, both of said members being concentrically pivoted, whereby they may be maintained in such position, one member being provided with a pointer, and a spring tending to return the same to zero position, and the other member having means for connection to the circuit carrying the current to be measured and also having an indicator coöperating with said pointer to show the relative angular position of the coils.

7. In an electrical measuring instrument, the combination of an actuating coil, a turning actuated coil in the magnetic field thereof, a spring connected to the actuated coil and tending to hold the same at zero position, a pointer controlled by said turning coil, a pivoted frame carrying the actuating coil and arranged to be turned to maintain a certain angular relation between the coils, and an indicator connected to the frame and coöperating with the pointer to show the relative angle between the coils.

8. In an electrical measuring instrument, the combination of an actuating coil and an actuated coil, both of which are concentrically pivoted, means to yieldingly maintain the latter in zero position, the actuating coil being manually turnable on its pivot to preserve a certain angular relation to the actuated coil, and a connection between the coils constructed to turn the actuated coil with the actuating coil, the connection including devices permitting limited relative movement of the actuated coil with respect to the actuating coil.

9. In an electrical measuring instrument, the combination of a pivotally mounted actuating coil having an indicator connected thereto and which turns therewith, a concentric turning actuated coil in the magnetic field of said actuating coil and arranged to be turned thereby according to current passed through the same, a pointer connected to the actuated coil, a connection permitting limited movement between the indicator and the pointer, whereby the actuated coil will be turned to approximate position when the actuating coil is turned, and a spring connected to the actuated coil and tending to hold the same in zero position.

In testimony whereof, I affix my signature in presence of two witnesses.

ROBERT D. HICKOK.

Witnesses:
G. S. JONES,
C. F. KLEINWACHTER.